US007477661B2

(12) United States Patent
Scott

(10) Patent No.: US 7,477,661 B2
(45) Date of Patent: *Jan. 13, 2009

(54) METHOD, SYSTEM, AND COMPUTER PROGRAM PRODUCT FOR MANAGING JITTER

(75) Inventor: Mark Scott, Ashburn, VA (US)

(73) Assignee: Vertical Communications Acquisition Corp., Santa Clara, CA (US)

( * ) Notice: Subject to any disclaimer, the term of this patent is extended or adjusted under 35 U.S.C. 154(b) by 759 days.

This patent is subject to a terminal disclaimer.

(21) Appl. No.: 10/696,998

(22) Filed: Oct. 31, 2003

(65) Prior Publication Data

US 2005/0007952 A1    Jan. 13, 2005

Related U.S. Application Data

(63) Continuation of application No. 09/429,652, filed on Oct. 29, 1999, now Pat. No. 6,665,317.

(51) Int. Cl.
*H04J 3/06* (2006.01)

(52) U.S. Cl. .................. 370/516; 370/253; 370/353; 375/371

(58) Field of Classification Search .................. 370/229, 370/232–235, 351–353, 503, 516, 252–256, 370/401, 518, 354–356, 465, 466; 375/354, 375/371
See application file for complete search history.

(56) References Cited

U.S. PATENT DOCUMENTS

| 5,621,727 | A | 4/1997 | Vaudreuil | 370/60 |
|---|---|---|---|---|
| 5,742,596 | A | 4/1998 | Baratz et al. | 370/356 |
| 5,757,871 | A | 5/1998 | Furukawa et al. | 375/372 |
| 5,790,538 | A | 8/1998 | Sugar | 370/352 |
| 5,790,543 | A | 8/1998 | Cloutier | 370/395 |
| 5,805,602 | A | 9/1998 | Cloutier et al. | 370/516 |
| 5,812,840 | A | 9/1998 | Shwartz | 395/604 |
| 5,870,464 | A | 2/1999 | Brewster et al. | 379/219 |
| 5,892,822 | A | 4/1999 | Gottlieb et al. | 379/220 |
| 5,897,613 | A | 4/1999 | Chan | 704/210 |

(Continued)

FOREIGN PATENT DOCUMENTS

WO    WO 97/14238 A1    4/1997

(Continued)

OTHER PUBLICATIONS

*Array Series 3000 Users Manual*, Array Telecom Corp, Entire Manual (Aug. 27, 1999).

(Continued)

*Primary Examiner*—Aung S Moe
*Assistant Examiner*—Curtis A Alia
(74) *Attorney, Agent, or Firm*—Sterne, Kessler, Goldstein & Fox PLLC

(57) ABSTRACT

A method, system and computer software product for managing jitter buffering that accurately measures network latency, the variation in latency (also known as jitter), and efficiently manages the media packet stream and jitter buffers is disclosed. A framer time-stamps incoming packets. A traffic analyzer maintains a sliding window of statistics generated from a recent set of packets. A jitter manager monitors packets, receives and makes adjustments based on information received from the traffic analyzer, and manages any connected jitter buffers.

3 Claims, 14 Drawing Sheets

U.S. PATENT DOCUMENTS

| | | | | |
|---|---|---|---|---|
| 5,900,000 | A | 5/1999 | Korenshtein | 707/200 |
| 5,940,479 | A | 8/1999 | Guy et al. | 379/93.01 |
| 5,940,827 | A | 8/1999 | Hapner et al. | 707/8 |
| 5,940,829 | A | 8/1999 | Tsuiki et al. | 707/10 |
| 5,940,832 | A | 8/1999 | Hamada et al. | 707/100 |
| 5,953,405 | A | 9/1999 | Miloslavsky | 379/265 |
| 6,360,271 | B1 * | 3/2002 | Schuster et al. | 370/516 |
| 6,363,429 | B1 * | 3/2002 | Ketcham | 709/235 |
| 6,452,950 | B1 * | 9/2002 | Ohlsson et al. | 370/516 |
| 6,658,027 | B1 * | 12/2003 | Kramer et al. | 370/516 |
| 6,862,298 | B1 * | 3/2005 | Smith et al. | 370/516 |
| 2003/0026275 | A1 * | 2/2003 | Lanzafame et al. | 370/412 |
| 2004/0120309 | A1 * | 6/2004 | Kurittu et al. | 370/352 |
| 2007/0201491 | A1 * | 8/2007 | Kapon | 370/395.62 |

FOREIGN PATENT DOCUMENTS

| | | |
|---|---|---|
| WO | WO 97/23078 A1 | 6/1997 |
| WO | WO 97/27692 A1 | 7/1997 |
| WO | WO 97/28628 A1 | 8/1997 |

OTHER PUBLICATIONS

*ctvoice IP Telephony*, Product Brochure, Comdial, 6 Pages (Copy obtained Aug. 1999).

*ctvoice System User's Manual*, Comdial, Entire Manual (Jun. 1998).

Yang, C., *INETPhone: Telephone Services and Servers on Internet*, at http://www.ds.internic.net/rfc/rfc1789.txt, 6 pages, (Apr. 1995).

Prosise, Jeff, "Programming Windows 95 with MFC, Part VII: The Document/View Architecture," Microsoft Systems Journal (Redmond, Washington), 35 pages, Feb. 1996.

Anquetil, L-P et al., "Media Gateway Control Protocol and Voice Over IP Gateways: MGCP and VoIP Gateways Will Offer Seamless Interworking of New VoIP Networks with Today's Telephone Networks," Alcatel Commununications Review-2nd Quarter, Alcatel Corporate Research Center, Marcoussis, France, Apr. 1999, pp. 151-157.

International Search Report, issued Aug. 29, 2000, for PCT/US00/02330, 5 pages.

Held, G., *Voice Over Data Networks*, McGraw-Hill Series, Copyright 1998.

McConnell, B., *How to Build an Internet PBX* (Apr. 1997), <http://www.hellodirect.net/tutorial/ip-phone.htm, 10 pages.

Sheldon, T., *Encyclopedia of Networking*, McGraw-Hill, 1998, Table of Contents, pp. 503-543, 959-968 and 1047-1050.

* cited by examiner

Voice Over Internet
Protocol Architecture

Jitter Buffering

Managed Buffering of Jitter

METHOD, SYSTEM, AND COMPUTER PROGRAM PRODUCT FOR MANAGING JITTER

CROSS-REFERENCE TO RELATED APPLICATION

This application is a continuation of U.S. application Ser. No. 09/429,652, filed Oct. 29, 1999 and issued as U.S. Pat. No. 6,665,317 on Dec. 16, 2003, which is hereby incorporated by reference herein in its entirety.

BACKGROUND OF THE INVENTION

1. Field of the Invention

The present invention pertains to achieving optimal quality when transmitting voice data over a lossy network; more particularly, it pertains to managing jitter buffering of data packets over a packet-switched network.

2. Related Art

Latency and jitter are important aspects of network performance that can degrade communication between any two points on a packet-switched network, like the Internet. Latency is the delay introduced on packets during travel from one site to another. Latency will be perceived by the end users as a delay in the response of the remote site. Jitter is the variation in latency from one packet to another.

Latency and jitter each impact communication differently. For example, if packets always arrived 50 milliseconds (ms) after being transmitted, then there would be a 50 ms latency and no jitter. In another example, however, if packet #1 arrived 100 ms after transmission, packet #2 arrived 50 ms after transmission, and packet #3 arrived 150 ms after transmission, there would be an average jitter of +/−33 ms. In voice over Internet protocol (VOIP) applications, jitter is more critical than latency. Jitter can cause a packet to arrive too late to be useful. The effect is that the packet may be delayed enough that the end user will hear a pause in the voice that is talking to them, which is very unnatural if it occurs during the middle of a word or sentence.

Jitter typically occurs when the network utilization is too high, and packets are being queued, causing delivery times to become unpredictable. The Internet, because of its complex structure, is often subject to varying degrees of jitter. Jitter variation can occur at different locations and at different times depending upon network traffic and other conditions. Thus, jitter needs to be managed.

Effective jitter management is especially needed in VoIP applications. Each VoIP call needs jitter management. FIG. 1 shows an example VoIP architecture 100, including gateways 110, 120 that provide an interface between public-switched telephone networks (PSTN) 130, 140 and a packet-switched network 102. A voice call is carried out between telephone 150 and telephone 160 through PSTN 130, gateway 110, network 102, gateway 120, and PSTN 140.

Static jitter buffering is one conventional technique to compensate for jitter. As shown in FIG. 2, static jitter buffering is carried out in gateway 120 which receives voice packets from network 102. A static jitter buffer 220 is provided to buffer the received voice packets from network 102. In such static jitter buffering, however, there is a compromise between the size of the jitter buffer and the delay of voice packets waiting in the jitter buffer. In particular, if the jitter buffer is large, it accommodates greater variation in jitter. The output packet traffic may not be jittery, but noticeable delays occur. If the jitter buffer is small, the delay is smaller but gaps in traffic are not accommodated.

SUMMARY OF THE INVENTION

A method, system, and computer program product is provided that manages jitter in packet-switched networks. In one embodiment, the present invention manages jitter in a VoIP system that includes a framer, a traffic analyzer, and a jitter manager. The framer time-stamps incoming packets and discards out-of-order packets. The framer outputs the in-order packets to the traffic analyzer and the jitter manager. The traffic analyzer maintains a sliding window array of a set of packets for use in calculating jitter statistics. These statistics are sent from the traffic analyzer to the jitter manager. The jitter manager uses these statistics to manage the flow of packets, the insertion or discardation of silence packets, and the supervision of any connected jitter buffers.

Handling jitter comes at the expense of latency, however, since the only way to handle jitter is to buffer additional data. So that when the data arrives exceptionally late, continuous playback to the end user can be maintained. Yet, the present invention manages the jitter buffer's size so that the latency does not grow too long. In this way, the present invention compensates for network jitter without resorting to excessive buffering.

Further embodiments, features, and advantages of the present invention, as well as the structure and operation of the various embodiments of the present invention, are described in detail below with reference to the accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
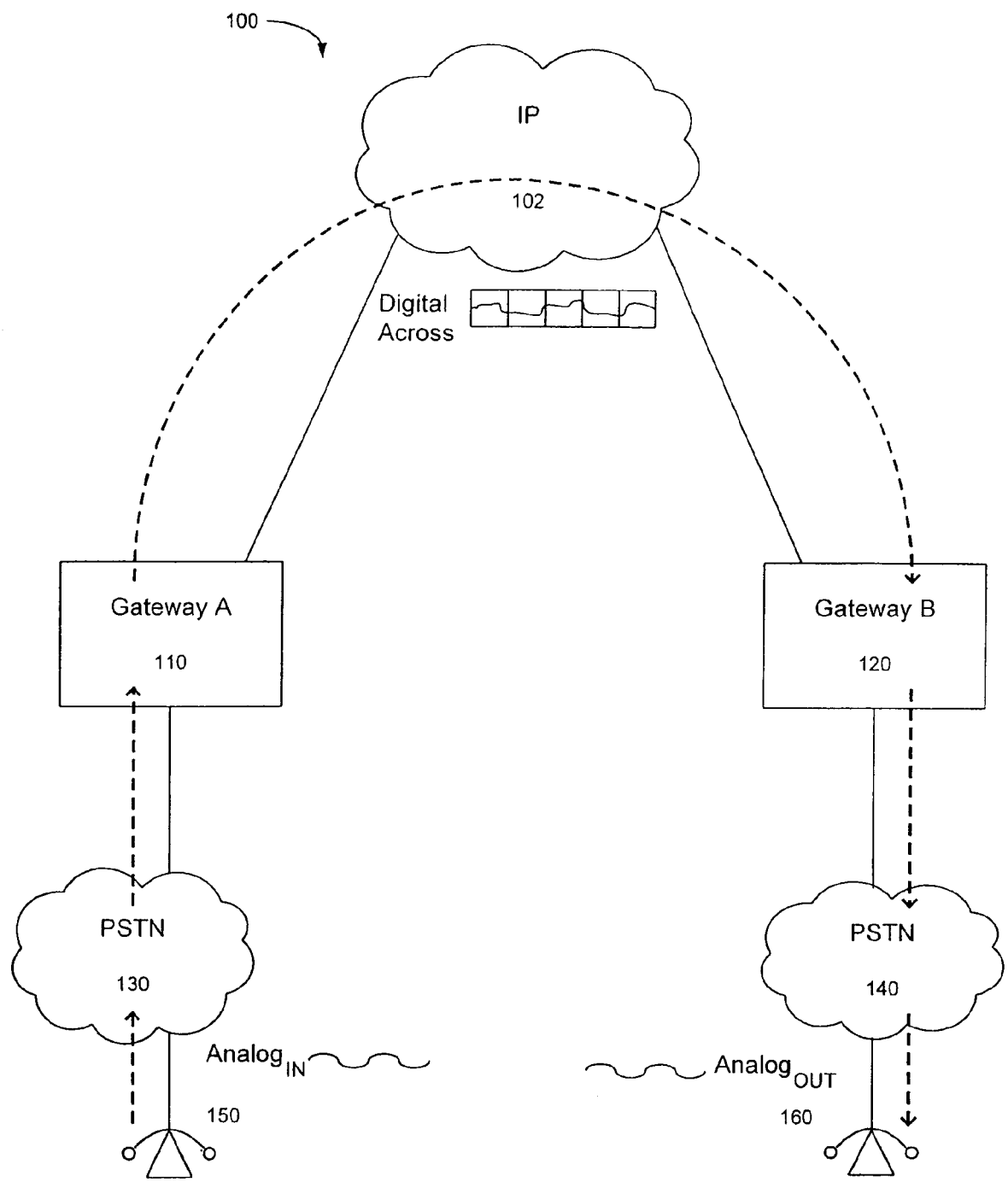
FIG. 1 illustrates how a packet generally travels over a VoIP system.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Table of Contents
I. Overview and Discussion
II. Terminology
III. Managed Jitter Buffering Embodiment
IV. Example Computer System
V. Conclusion I. Overview and Discussion One shortfall of early VoIP systems was the poor quality of voice (jittery voice) and the unacceptable latency caused by the fluctuating, and at times less than adequate bandwidth available through the Internet.

According to the present invention, jitter buffer managing is used to resolve the quality of voice over the unpredictable and some time limited bandwidth of the Internet. This capability adjusts the size and contents of the jitter buffer, thus minimizing jitter.

The present invention provides a method, system, and computer program product for managing jitter. In one embodiment, there are four basic components:
Framer
Traffic Analyzer
Jitter Manager
Jitter Buffer These components are delineated only for explanation, and the features of each component can easily be incorporated into other components. In one example, these components can be implemented on a gateway server within a VoIP system described in co-pending U.S. patent application Ser. No. 09/393,658 (incorporated herein by reference in its entirety). However, the gateway server and reference are not intended to limit the present invention.

In one example, the present invention provides a method for achieving optimal quality when transmitting voice over a lossy network. The origin gateway indexes the outgoing packets. The framer time-stamps incoming packets and discards out-of-order packets. The traffic analyzer determines jitter statistics for the traffic of in-order packets output from the framer. The traffic analyzer communicates the jitter statistics to the jitter manager. The jitter manager coordinates the incoming traffic of in-order, time-stamped, indexed packets based on the jitter statistics from the traffic analyzer and the contents of the packets from the framer. The jitter manager inserts or discards silence packets, and maintains the jitter buffer.

In one implementation, a framer, traffic analyzer, jitter manager and jitter buffer can run on the same server or personal computer (PC). Alternatively, the functionality of the jitter buffer managing system can be carried out on physically separate machines. For example, a network could typically include a framer running on a gateway server. The traffic analyzer and jitter manager can be connected to the same network, but run on a different PC. The jitter buffer can be implemented in hardware or software.

II. Terminology

The term "traffic" refers to voice, facsimile, video, multimedia, digital information, or other data that can be sent between telephony terminal equipment and/or network terminal equipment.

The term "jitter statistics" refers to any of a number of statistics generated from the values calculated for jitter, jitter variation (also known as interpacket time or width, which reflect changes in the size of a packet from start to destination), average jitter, average jitter variation and any combination thereof.

The term "sliding window array" refers to a matrix or other data structure which can be filled with jitter statistics and updated.

III. Managed Jitter Buffering Embodiment

Figure 3:
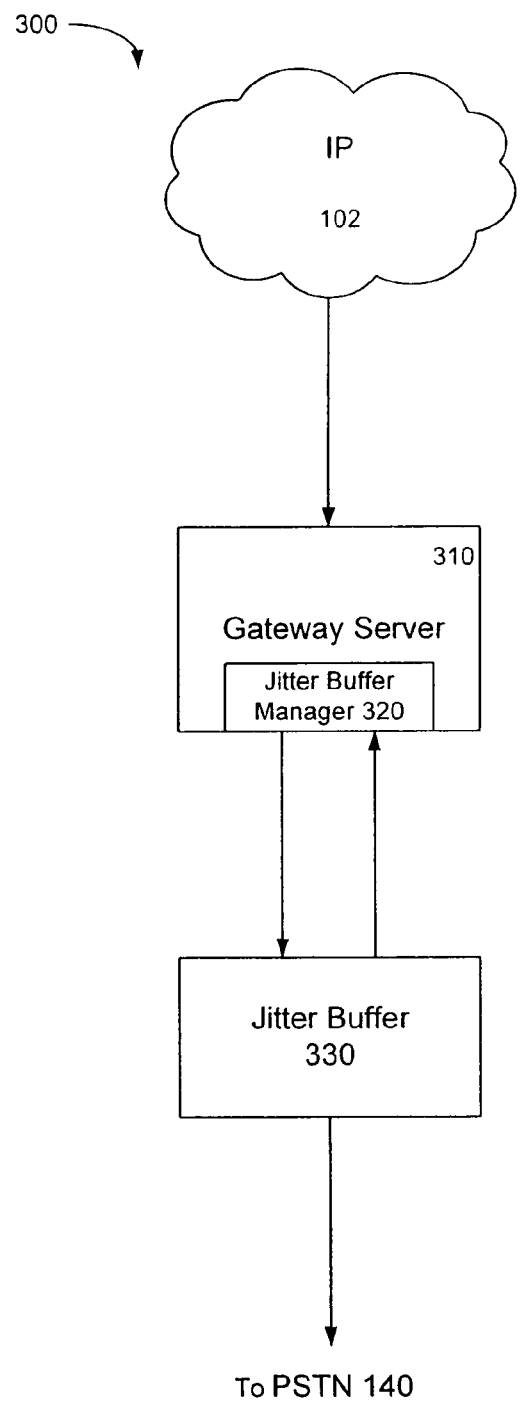
FIG. 3 is a diagram of a jitter buffer managing system according to one embodiment of the present invention.

FIG. 3 shows an example VoIP architecture 300 that includes a gateway server 310 coupled to a PSTN 140. According to the present invention, gateway server 310 includes a jitter buffer manager 320 coupled to jitter buffer 330. Jitter buffer 330 represents any number of jitter buffers, static, dynamic or adaptive, implemented in hardware or software.

Figure 4:
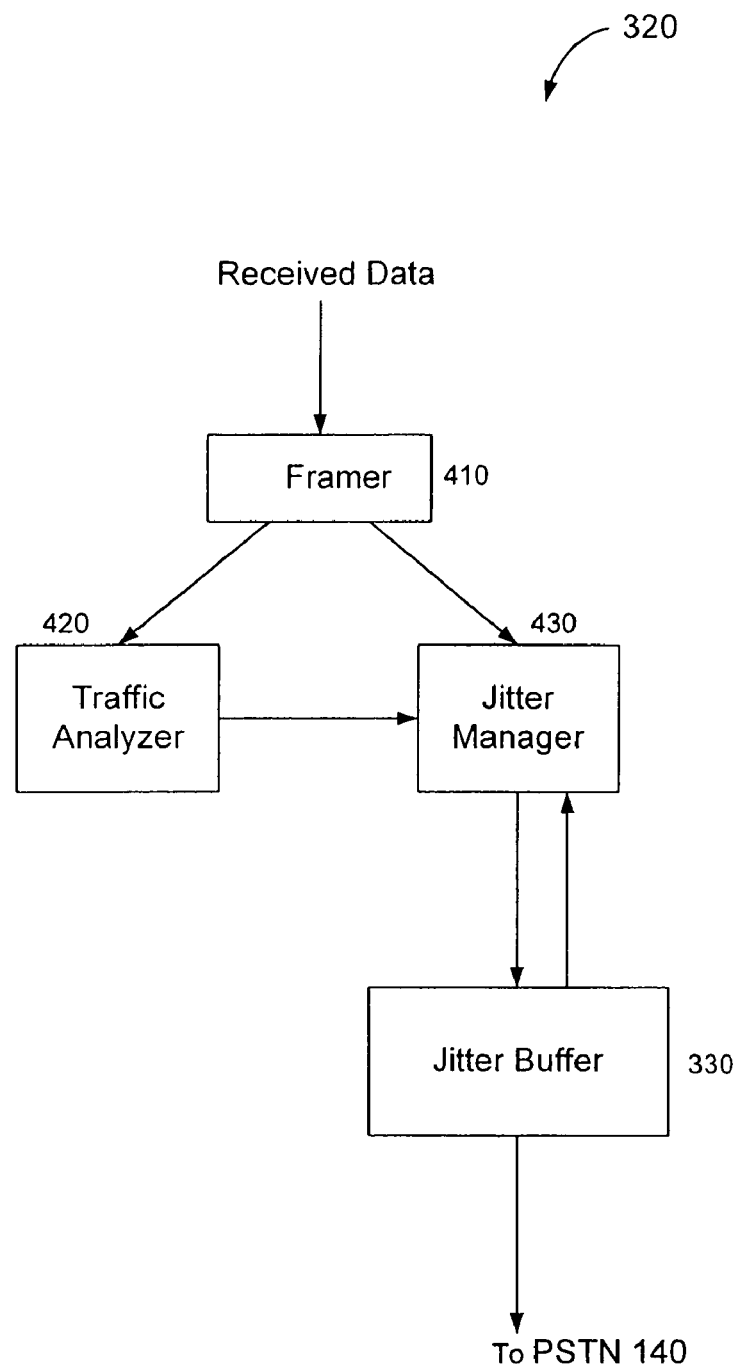
FIG. 4 is a diagram illustrating a jitter buffer managing system of FIG. 3 according to the present invention.

FIG. 4 is a diagram of a jitter buffer manager 320 according to an embodiment of the present invention. Jitter buffer manager 320, among other things, minimizes the effects of packet loss, latency and packet degradation intrinsic to communication on packet-switched networks like the Internet.

Jitter buffer manager 320 includes a framer 410, a traffic analyzer 420, a jitter manager 430, and a jitter buffer 330. For example, framer 410 is coupled to traffic analyzer 420 and jitter manager 430. Traffic analyzer 420 is coupled to jitter manager 430. Jitter manager 430 is coupled to jitter buffer 330. Each of these components can run on the same PC or on separate PCs over a network.

Figure 5:
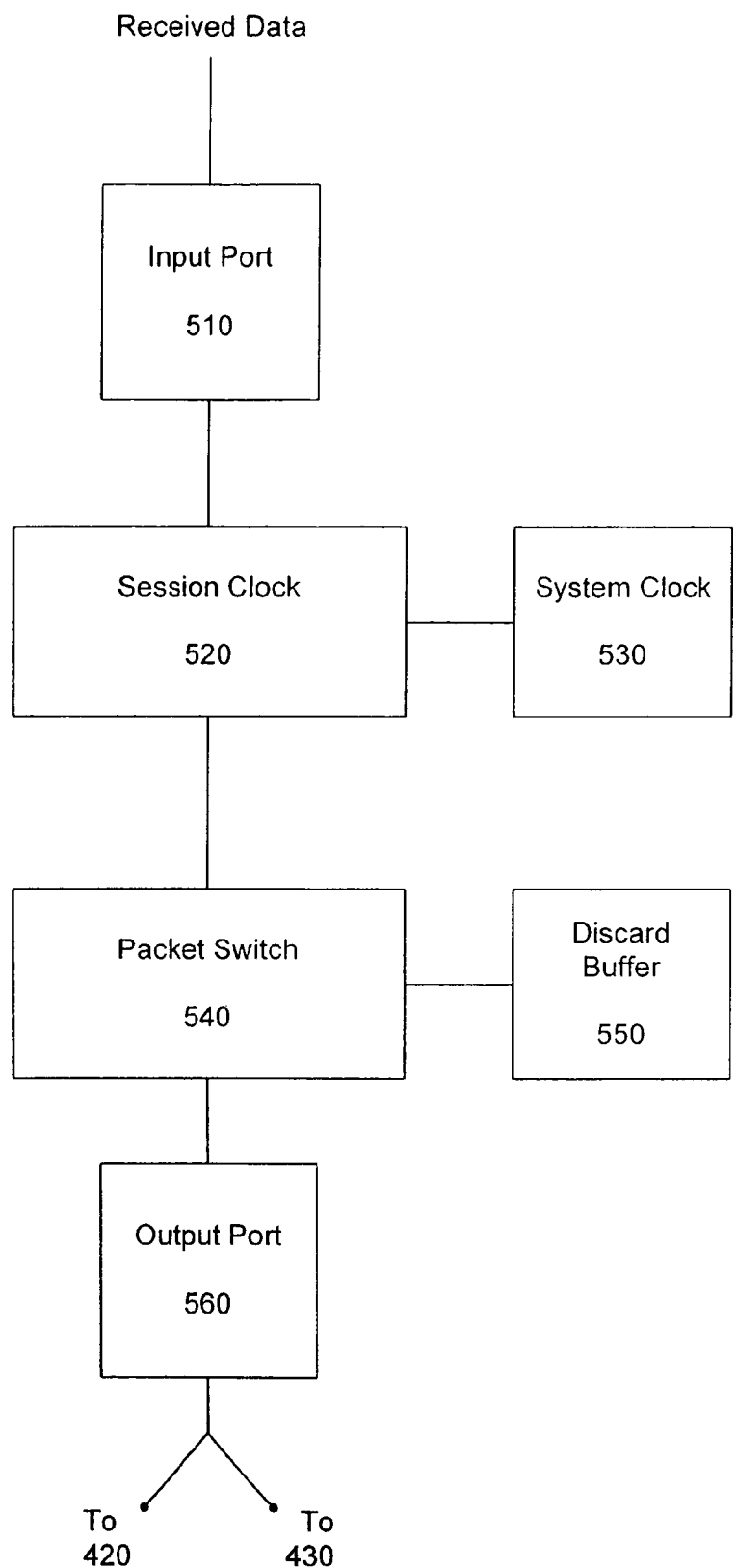
FIG. 5 is a diagram for a framing system of FIG. 4 according to the present invention.

An overview of each of the components of jitter buffer manager 320 is now provided. One example of a framer is shown in FIG. 5. Framer 410 includes an input port 510, a session clock 520, a system clock 530, a packet switch 540, a discard buffer 550, and an output port 560. For example, an input port 510 is coupled to a session clock 520. A system clock 530 is coupled to a session clock 520. A session clock 520 is coupled to a packet switch 540. A packet switch is coupled to a discard buffer 550 and an output port 560.

Figure 6:
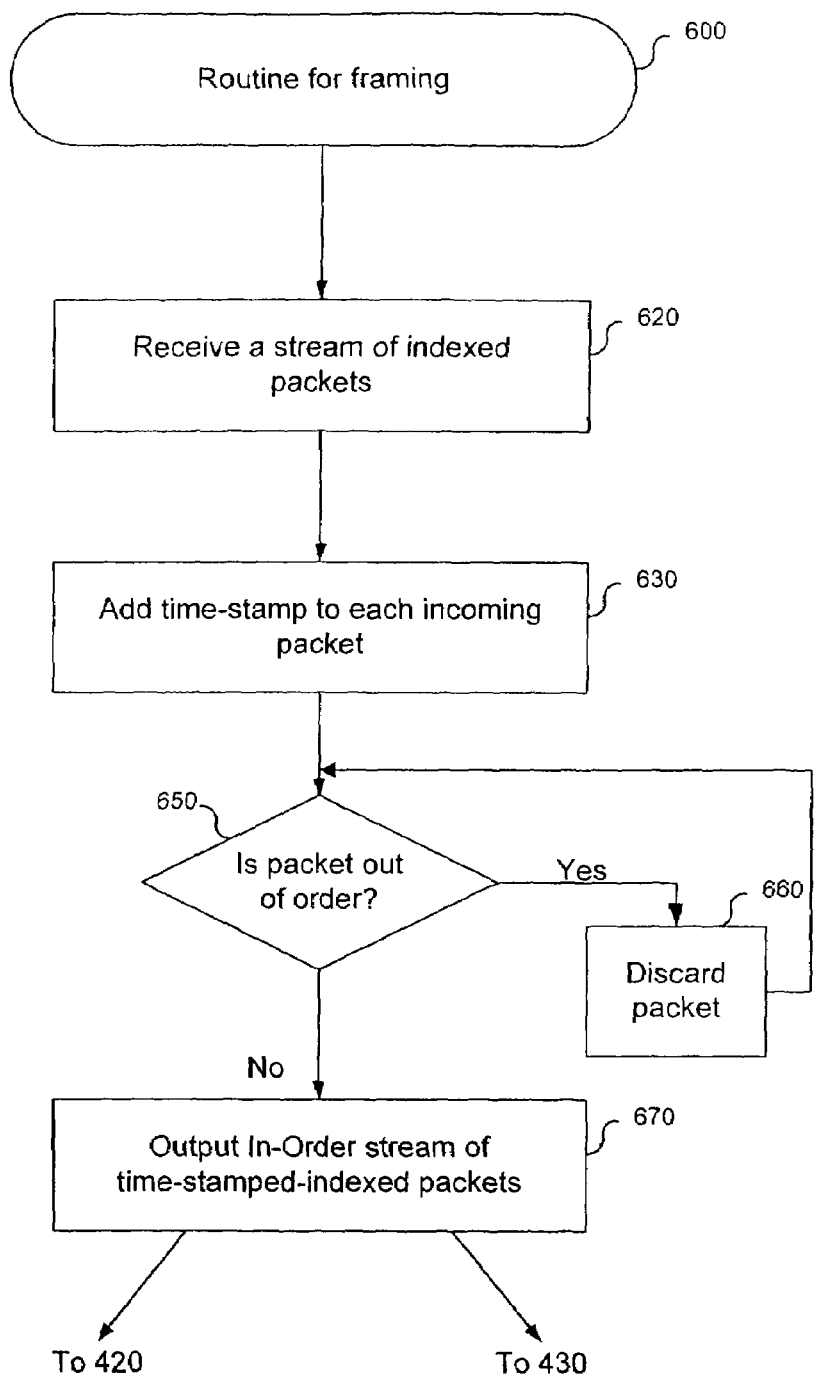
FIG. 6 is a diagram of a method for framing in one example implementation of the present invention.

For clarity, the operation of framer 410 is further described with respect to routine for framing 600 (FIG. 6). Input port 510 receives network traffic as indexed packets (step 620). Packets can be indexed in numerous ways. It is well-known in the field of the present invention that headers can be added to packetized data. These headers can contain routing information, time-stamps, and other information. Here, an index is added by the origin gateway 110. Session clock 520 time-stamps each indexed packet upon its arrival (step 630) to produce time-stamped, indexed packets. Session clock 520 maintains its clock through a connection to the system clock 530. The system clock 530 can be hardware or software, resident or maintained on another PC.

Packet switch 540 carries out steps 650-660. In step 650, the time-stamp and index of each packet is checked to determine whether the packet arrived out-of-order. If the packet arrived out-of-order, it is discarded (step 660). Otherwise, in step 670, output port 560 sends the remaining packets to the traffic analyzer 420 and jitter manager 430. At this point, the traffic is a stream of in-order, time-stamped, indexed packets. Routine 600 was described above with respect to the example framer 410 shown in FIG. 5. This is not intended to limit the present invention. Other embodiments can be used as would be apparent to a person skilled in the art given this description.

Figure 7:
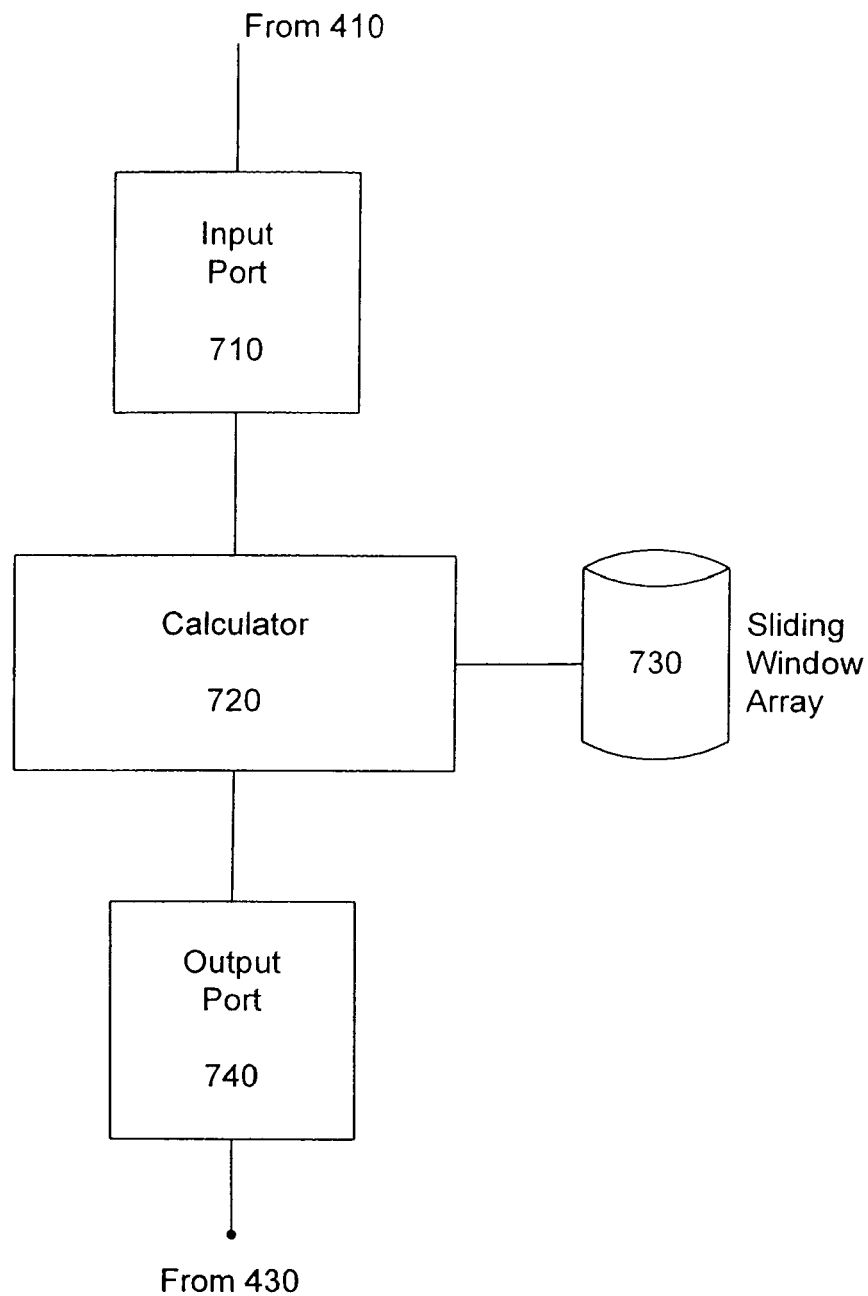
FIG. 7 is a diagram of a traffic analyzer of FIG. 4 according to the present invention.
Figure 8:
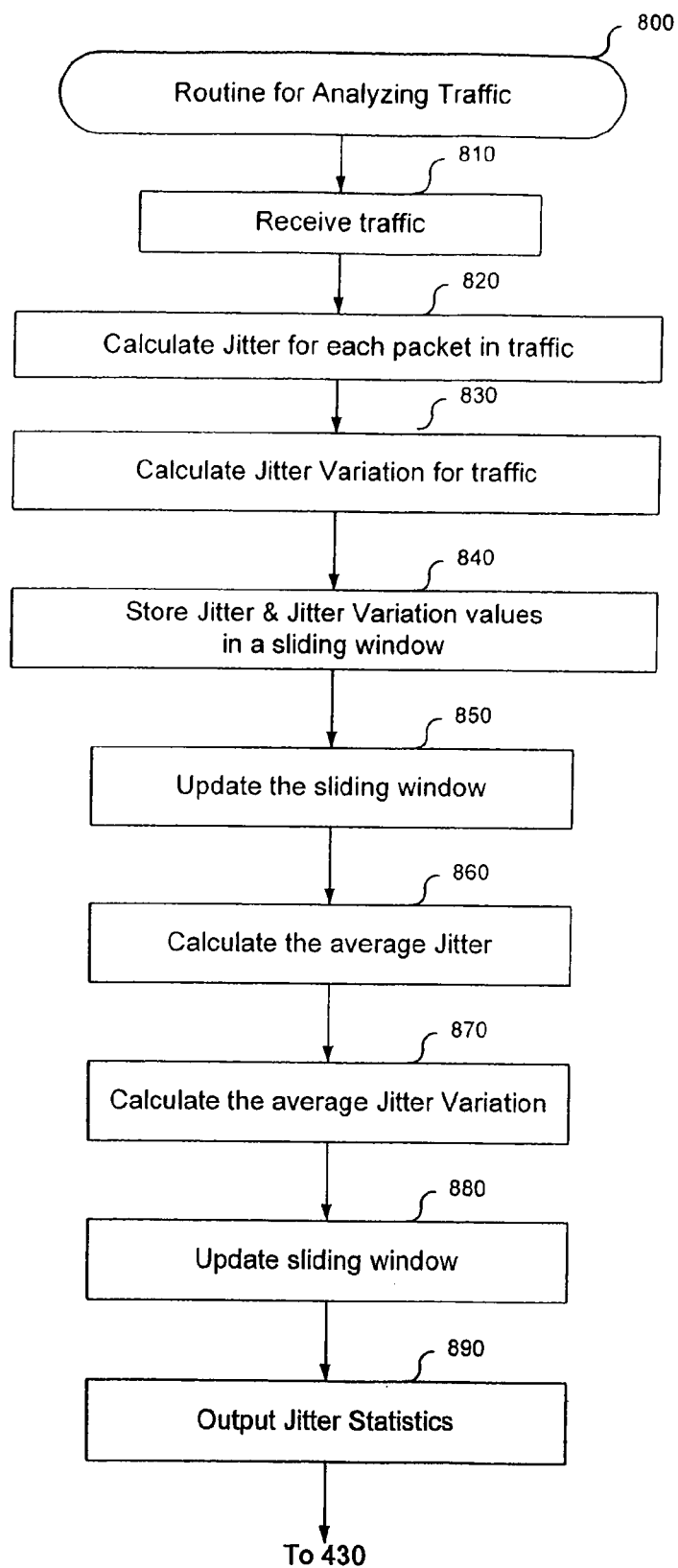
FIG. 8 is a diagram of a method for analyzing traffic in one example implementation of the present invention.

One example of a traffic analyzer is shown in FIG. 7. The traffic analyzer 420 includes an input port 710, a calculator 720, a sliding window 730, and an output port 740. For example, input port 710 is coupled to calculator 720. Calculator 720 is coupled to sliding window array 730 and output port 740. For clarity, the operation of the traffic analyzer 420 is further described with respect to routine for analyzing traffic 800 (FIG. 8). Input port 710 receives traffic (step 810) from the framer 410. In one embodiment, the traffic is a stream of in-order, time-stamped, indexed packets. Calculator 720 calculates the jitter (step 820) and jitter variation (step 830) for each received packet (step 810). For example, one way of calculating jitter is to take the absolute value of the difference between the actual interpacket time and the theoretical interpacket time. The interpacket time is width in terms of time of a packet. For instance, a 30 ms packet has a theoretical interpacket time of 30 ms. This same packet may not arrive at the destination gateway 120 with the same interpacket time. Thus, jitter is the difference between the actual or received interpacket time and its theoretical value.

Similarly, jitter variation can be calculated (step 830). In one embodiment of the present invention, if the sliding window array 730 is empty, then jitter variation is considered to be zero. Otherwise, average jitter is calculated using the sliding window array 730, and jitter variation is the absolute value of the difference between the present jitter and average jitter. In one example, the average jitter is calculated by summing the jitter values over a number of jitter points. More specifically, the sliding window array 730 stores the jitter, jitter variation for the last Ns packets (Ns is a variable). J[1] refers to most recently stored jitter value, J[Ns] refers to the oldest jitter value that is still stored. Similarly, JV[1] refers to most recently stored jitter variation value, JV[Ns] refers to the oldest jitter variation value that is still stored. Updating the sliding window (step 850) consists of shifting J[1] into J[2], J[2] into J[3], and storing the new value in J[1]. The value previously stored in J[Ns] will be lost in this process. The same procedure is used to update JV values. The sliding window array 730 stores the jitter and jitter variation (step 840). The sliding window array 730 is updated with these jitter statistics for each packet (step 850).

In one embodiment, the average jitter is calculated (step 860) by computing $Jave=(Cw[1] \times J[1]+ Cw[2] \times J[2]+...+ Cw[Ns] \times J[Ns])/(Cw[1]+Cw[2]+...+ Cw[Ns])$. For this embodiment, Cw[1...Ns] are coefficients that are used to give more weighting to certain packets in relation to one another within the sliding window array 730. The same procedure is used to compute JVave (step 870). Thus, calculator 720 calculates an average value for jitter and jitter variation (steps 860-870) and updates the sliding window with these values (step 880). In one embodiment, these values are outputted (step 890) via output port 740 to the jitter manager 430. Routine 800 was described above with respect to the example traffic analyzer shown in FIG. 7. This is not intended to limit the present invention. Other embodiments can be used as would be apparent to a person skilled in the art given this description.

Figure 9:
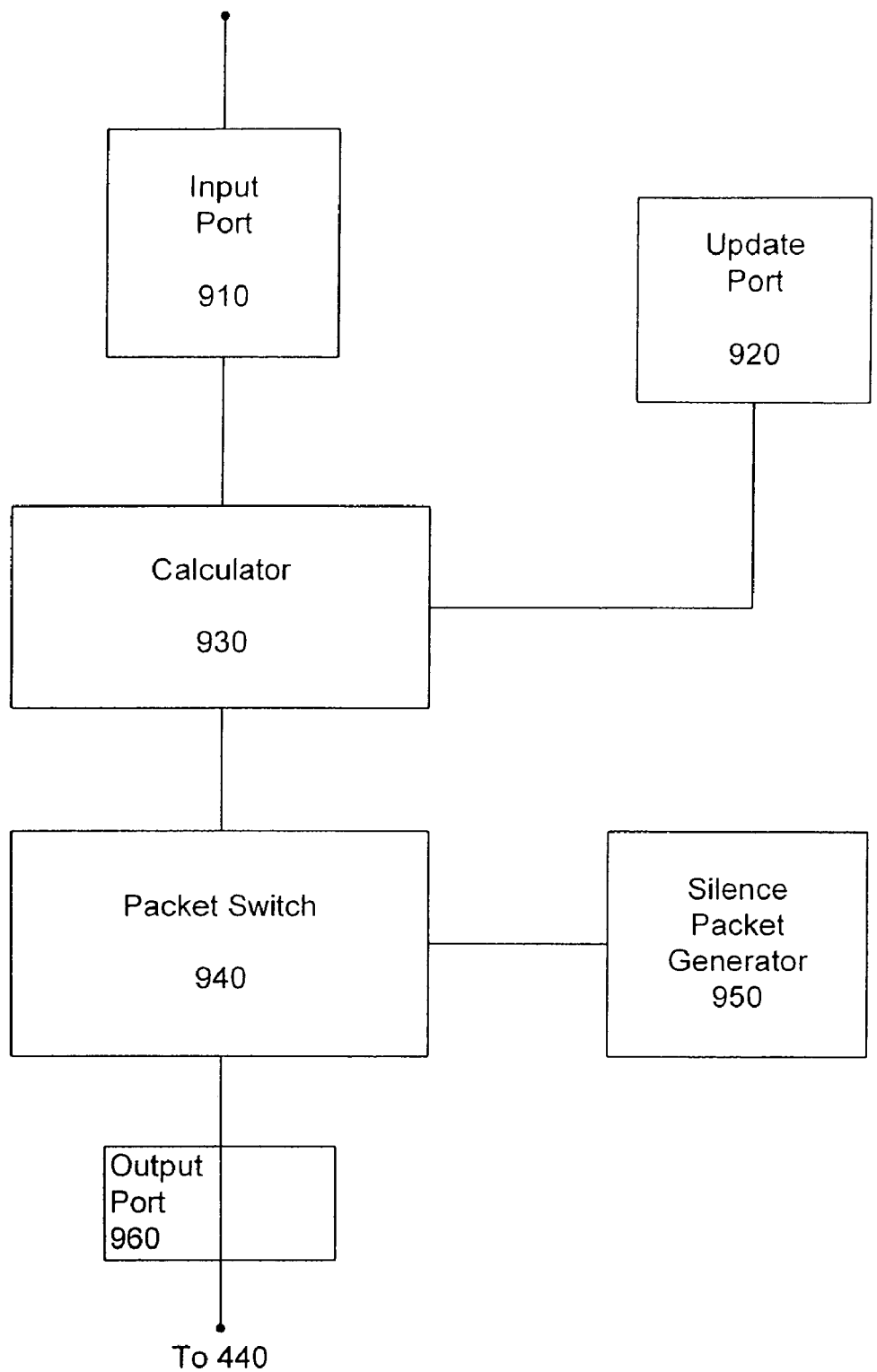
FIG. 9 is a diagram of a jitter manager of FIG. 4 according to the present invention.
Figure 10:
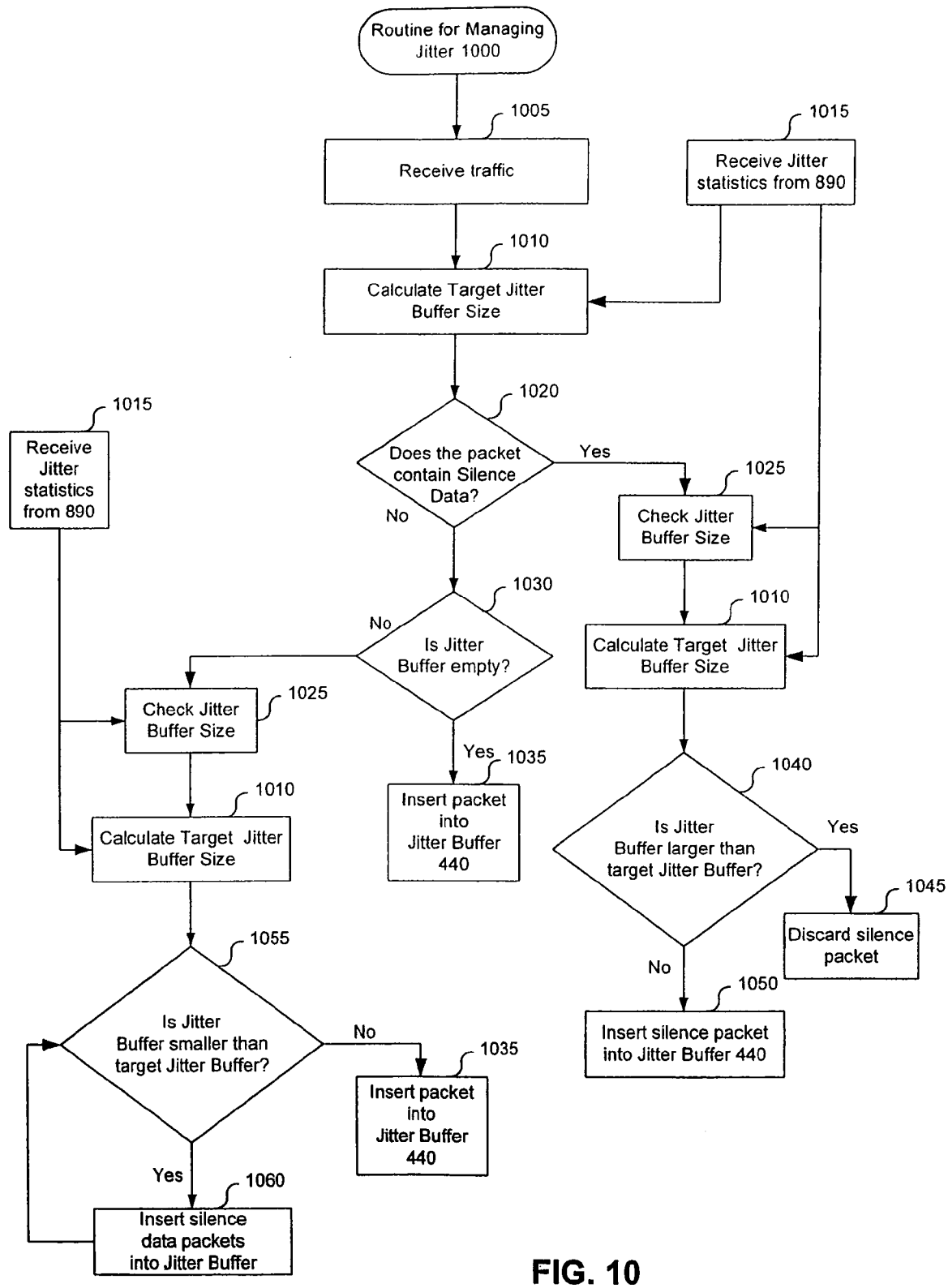
FIG. 10 is a diagram of a method for managing jitter in one example implementation of the present invention.

One example of a jitter manager is shown in FIG. 9. The jitter manager 430 includes an input port 910, an update port 920, a calculator 930, a packet switch 940, a silence packet generator 950, and an output port 960. For example, an input port 910 is coupled to a calculator 930. An update port 920 is coupled to calculator 930. Calculator 930 is coupled to packet switch 940. Silence packet generator 950 is coupled to packet switch 940. Packet switch 940 is coupled to output port 960. For clarity, the operation of the jitter manager 430 is further described with respect to routine for managing jitter 1000 (FIG. 10). Input port 910 receives traffic from the framer 410 (step 1005). In one embodiment, the traffic is in-order, time-stamped, indexed packets. Input port 910 sends the traffic to calculator 930. Calculator 930 also receives the jitter statistics from the update port 920 (step 1015). Calculator 930 calculates the target jitter buffer size (step 1010). In step 1020, each packet is checked to see if it contains silence data. If the packet does contain silence data, then, in one embodiment, the calculator 930 checks the current jitter buffer size (step 1025). The calculator 930 re-checks the target jitter buffer size (step 1010) using the jitter statistics (step 1015). In one example, the target jitter buffer size (step 1010) can then be calculated as: $Jt=Jc+(Cj \times Jave)+(Cv \times JVave)$. Jt is the target jitter buffer size. Jc is a jitter constant, representing the minimum possible target buffer size. Cj is the jitter co-efficient, adjusting how much observed jitter will be reflected in the target jitter buffer. Cv is the jitter variation co-efficient, adjusting how much observed jitter variation will be reflected in the target jitter buffer. In one embodiment, these values can be predetermined: Cw[1]=Cw[n]=Cw[Ns]=1, Jc=30 ms, Cj=1, and Cv=2.

In step 1040, the packet switch 940 compares the current actual jitter buffer size with the determined target jitter buffer size. If the actual jitter buffer size is larger than the target jitter buffer size, then the silence packet is discarded (step 1045). If the actual jitter buffer size is equal to or smaller than the target jitter buffer size, then the silence packet is inserted into the jitter buffer 330 (step 1050). If the packet does not contain silence data (step 1040), then, in one embodiment, the packet switch 940 checks to see if the jitter buffer 330 is empty (step 1030). If the jitter buffer 330 is empty, then the packet is inserted into the jitter buffer 330 (step 1035). If the jitter buffer 330 is not empty, then the calculator 930 checks the jitter buffer 330 as discussed above (step 1025).

The calculator 930 also compares the actual jitter buffer size with the target jitter buffer size (step 1055). In one embodiment, if the actual jitter buffer size is smaller than the target jitter buffer size, then a silence packet is inserted into jitter buffer 330 (step 1060). The packet switch 940 obtains silence packets from silence packet generator 950. The generation of silence packets is well-known in the field of the present invention. There was many ways to create packets and insert them into network traffic. Generating packets without any voice data is similarly straightforward. If the actual jitter buffer size is equal to or larger than the target jitter buffer size, then the packet switch 940 inserts the packet into jitter buffer 440 (step 1035).

Routine 1000 was described with respect to the example jitter manager in FIG. 9. This is not intended to limit the present invention. Other embodiments can be used as would be apparent to a person skilled in the art given this description.

Figure 2:
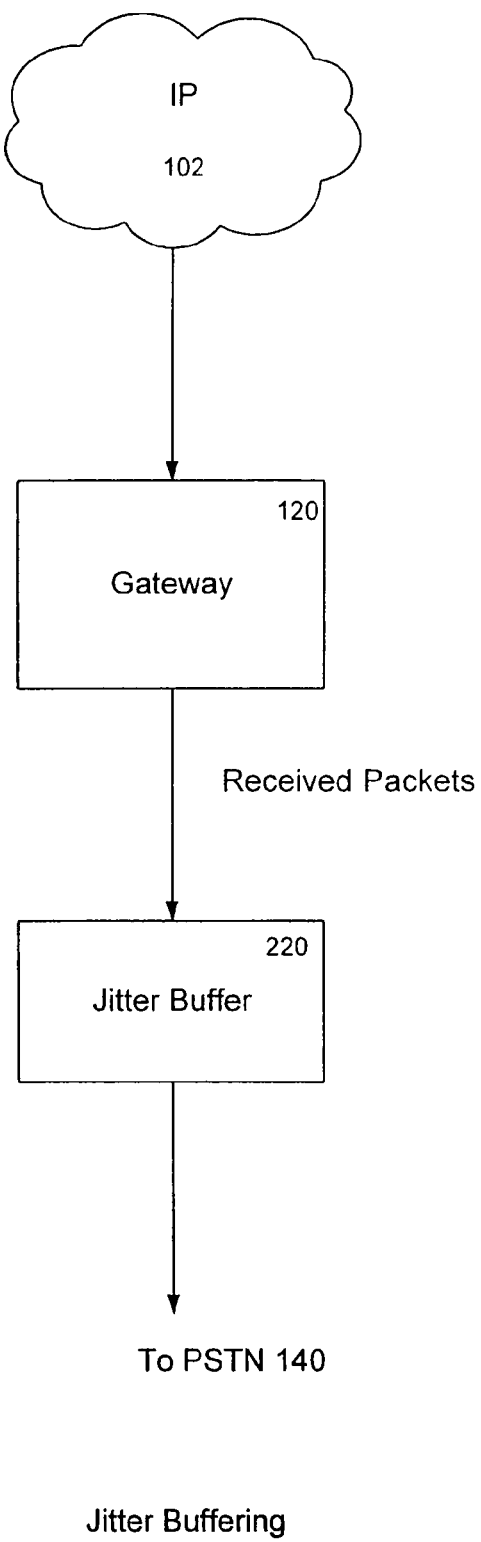
FIG. 2 is a diagram of a static jitter buffering system.
Figure 11:
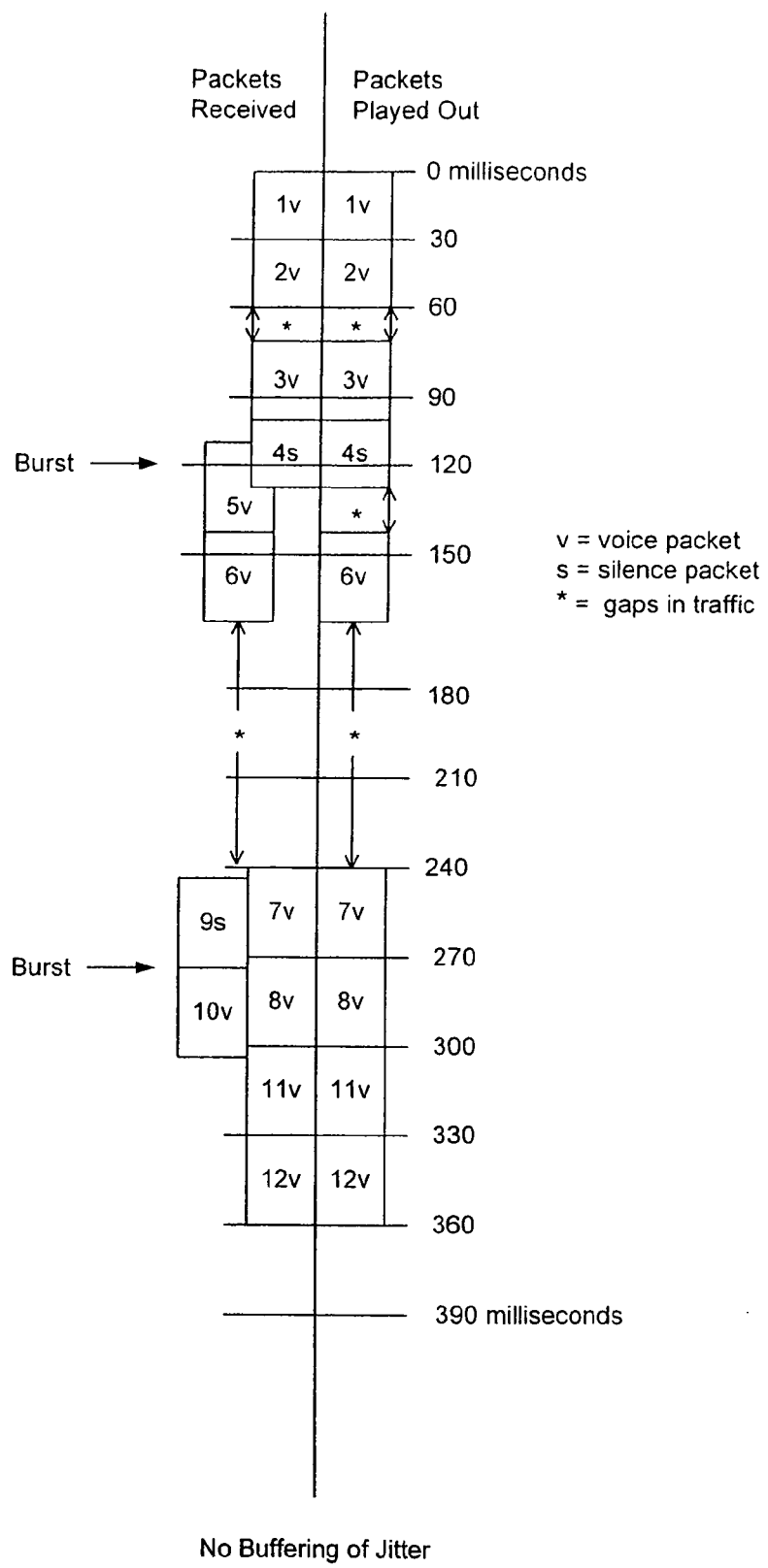
FIG. 11 is a diagram of the output of a gateway without jitter buffering.
Figure 12:
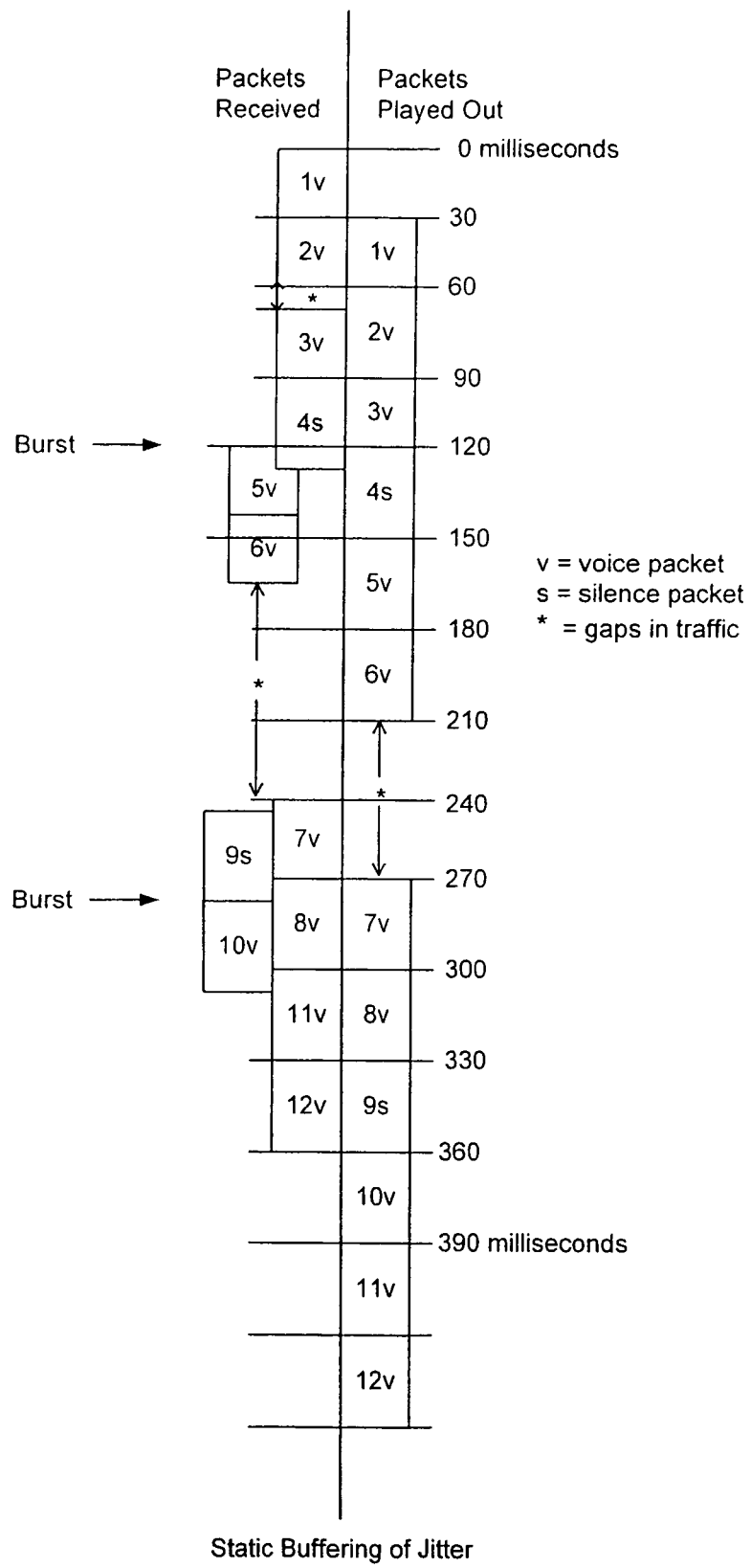
FIG. 12 is a diagram of the output of a gateway with static jitter buffering.
Figure 13:
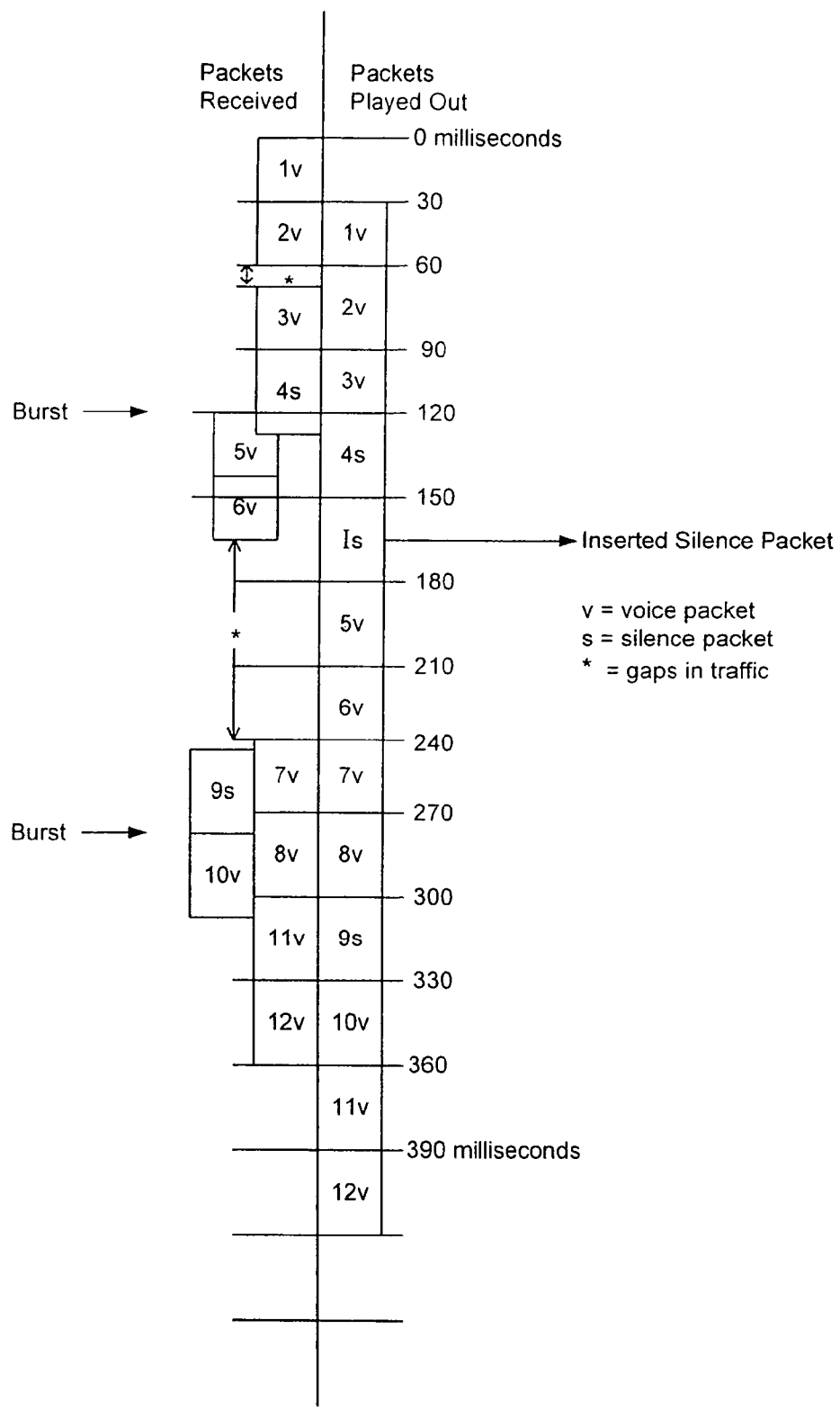
FIG. 13 is a diagram of the output of the present invention with managed buffering.

FIGS. 11-13 show various outputs of VoIP system. FIG. 11 shows the unbuffered output of gateway 120 to PSTN 140. FIG. 12 shows the output from a static jitter buffer 220 to PSTN 140 in FIG. 2. FIG. 13 shows the output from the jitter buffer 330 of FIG. 3, where an embodiment of the present invention is shown as the jitter buffer manager 320. Each of the figures shows the arrival of the same set of voice and silence packets along the left-hand column. Time is displayed in 30 ms segments. The packets have an interpacket time of 30 ms. The packets are numbered for illustrative purposes here, and the actual indexing of traffic may take other forms. For example, the index may start at zero (0) and count up until a silence packet is encountered by gateway 110. At this time, gateway 110 gives the next voice packet an index of zero (0) and repeats the process. Gaps are denoted in FIGS. 11-13 by a "*" symbol. The gaps and bursts in arrival time of the uniformly sent packets is illustrative of network congestion in IP 102.

In these examples, packets # 1 and # 2 arrive on time. Packets # 1 and # 2 are followed by a gap, and then the delayed packets # 3 and # 4. Packets #5 and # 6 arrive on time. Packets # 5 and # 6 are followed by another gap. Packets # 7 and # 8 arrive at almost the same time as packets #9 and #10. These packets are immediately followed by packets #11 and #12. This pattern of received packets is exemplary of the results of network congestion. These different outputs show in the right-hand column of these figures. The outputs are discussed in detail below.

FIG. 11 shows the loss of packets #5, #9 and #10. Network congestion and the lack of any buffering to retain these packets caused the system to lose them. The resulting output has gaps or breaks in conversation. This is not a desirable result as the flow of the conversation is compromised. Traditionally, this problem was alleviated by providing a static buffer.

FIG. 12 shows the output from static buffering. Here, the static buffer receives the same data as in FIG. 11, but waits 30 ms before playing the packets out. The packets are held in the buffer. This means that communications are delayed 30 ms (or one packet) each time the buffer is empty. Typically, a buffer can hold 300 ms (or 10 packets), but other configurations are possible. The buffer plays out the packets until it is empty. The gap after packet #2 is small enough that the buffer can cover it. The gap after packet #6 is too large for the buffer to cover. The result is a gap or break in the packet flow, which is interpreted as a break in the conversation. The static buffer holds packet #7 for 30 ms to regain some buffering. Although not shown here, a buffer can be configured to play out packets without any delay in the event of network congestion similar to that experienced in packets #6-#12. In such a configuration, the buffer would only be used to prevent packet loss during a burst.

FIG. 13 shows the output from a managed buffer taught by the present invention. The jitter buffer manager system 320 receives the same data as in FIG. 11 and FIG. 12. The jitter buffer manager system 320 is discussed in detail above. Among other things, the jitter buffer manager system 320 includes a packet switch 940. Packet switch 940 performs, among other things, steps 1020, 1030, 1040, and 1055. These steps perform the insertion and deletion of packets when the jitter buffer is smaller or larger than a target jitter buffer size. The target jitter buffer size is calculated based on the jitter statistics. In FIG. 13, the output of the managed buffer shows the insertion of a silence packet (Is) after packet #4. The silence packet is inserted when the actual jitter buffer size is smaller than the target jitter buffer size. This situation exists after the arrival of packets #3 and #4. Packets #3 and #4 arrive after a gap. The gap reduces the actual jitter buffer size below the target jitter buffer size. Thus, a silence packet is generated and inserted (step 1060). The insertion of the silence packet closes the gap in the packets which was present in both FIG. 11 and FIG. 12. With respect to the second burst, the jitter buffer manager 320 can be configured to play out packets immediately if jitter buffer 330 is empty (steps 1030 and 1035). Subsequently, the jitter buffer manager 320 would insert data and silence packets according to the steps of FIG. 10 to maintain the target jitter buffer size.

The advantages of the present invention are provided by the ability of the jitter buffer manager 320 to maintain jitter buffer 330 in such a way that the outputted traffic is continuous. Moreover, when the traffic is a stream of packets, the present invention maintains the coherency and quality of the voice data being outputted.

V. Example Computer System

Figure 14:
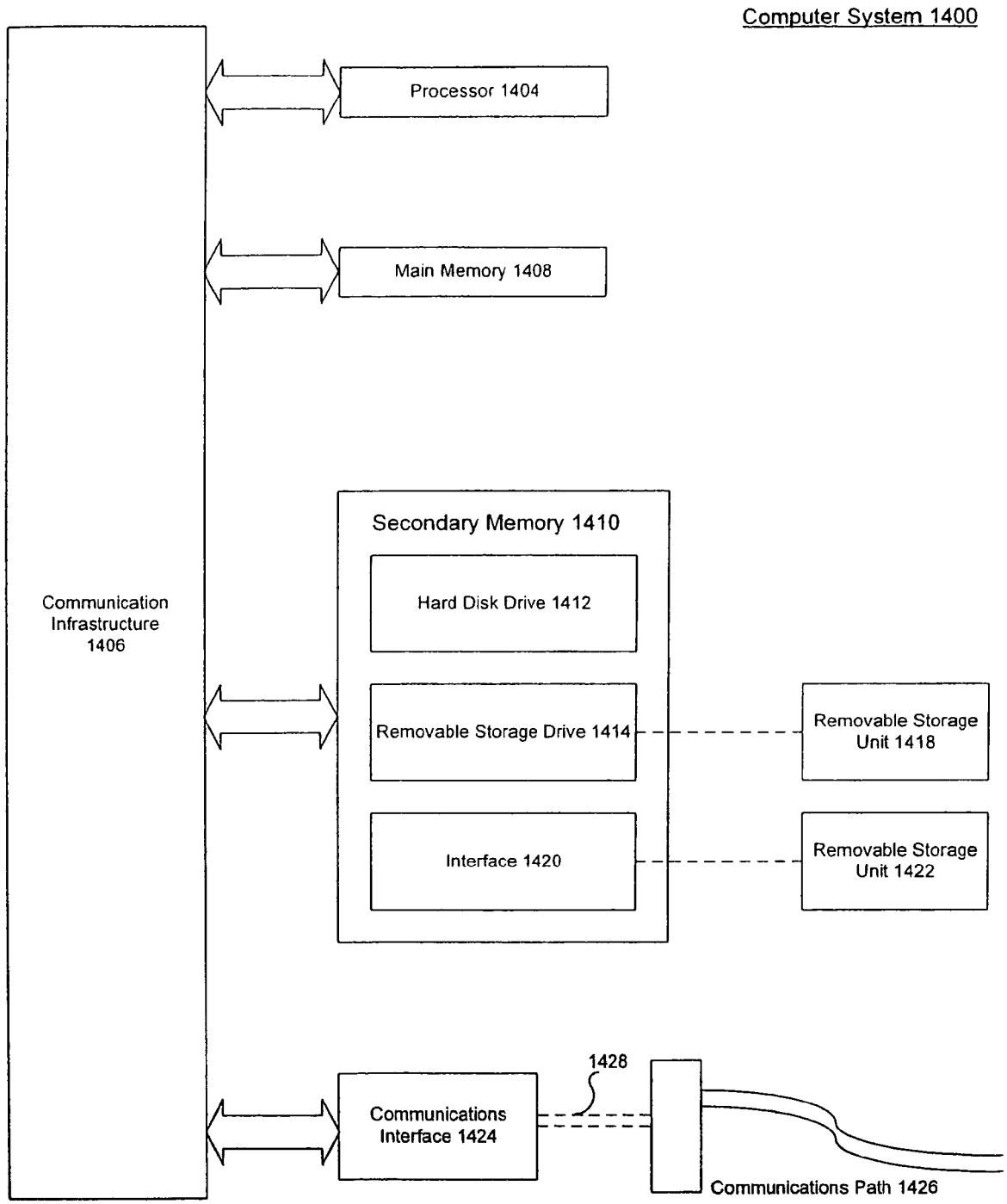
FIG. 14 is an example computer system in one example implementation of the present invention.

An example of a computer system 1400 is shown in FIG. 14. Computer system(s) 1400 can execute software to carry out any of the functionality described above with respect to jitter buffer manager system 320, including any of the components 410-430.

Computer system 1400 represents any single or multi-processor computer. Single-threaded and multi-threaded computers can be used. Unified or distributed memory systems can be used.

Computer system 1400 includes one or more processors, such as processor 1404. One or more processors 1404 can execute software implementing all or part of jitter manager system 400 as described above. Each processor 1404 is connected to a communication infrastructure 1402 (e.g., a communications bus, cross-bar, or network). Various software embodiments are described in terms of this exemplary computer system. After reading this description, it will become apparent to a person skilled in the relevant art how to implement the invention using other computer systems and/or computer architectures.

Computer system 1400 also includes a main memory 1408, preferably random access memory (RAM), and can also include secondary memory 1410. Secondary memory 1410 can include, for example, a hard disk drive 1412 and/or a removable storage drive 1414, representing a floppy disk drive, a magnetic tape drive, an optical disk drive, etc. The removable storage drive 1414 reads from and/or writes to a removable storage unit 1418 in a well known manner. Removable storage unit 1418 represents a floppy disk, magnetic tape, optical disk, etc., which is read by and written to by removable storage drive 1414. As will be appreciated, the removable storage unit 1418 includes a computer usable storage medium having stored therein computer software and/or data.

In alternative embodiments, secondary memory 1410 may include other similar means for allowing computer programs or other instructions to be loaded into computer system 1400. Such means can include, for example, a removable storage unit 1422 and an interface 1420. Examples can include a program cartridge and cartridge interface (such as that found in video game devices), a removable memory chip (such as an EPROM, or PROM) and associated socket, and other removable storage units 1422 and interfaces 1420 which allow software and data to be transferred from the removable storage unit 1422 to computer system 1400.

Computer system 1400 can also include a communications interface 1424. Communications interface 1424 allows software and data to be transferred between computer system 1400 and external devices via communications path 1426. Examples of communications interface 1424 can include a modem, a network interface (such as Ethernet card), a communications port, etc. Software and data transferred via communications interface 1424 are in the form of signals which can be electronic, electromagnetic, optical or other signals capable of being received by communications interface 1424, via communications path 1426. Note that communications interface 1424 provides a means by which computer system 1400 can interface to a network such as the Internet.

The present invention can be implemented using software running (that is, executing) in an environment similar to that described above with respect to FIG. 14. In this document, the term "computer program product" is used to generally refer to removable storage unit 1418, or a hard disk installed in hard disk drive 1412 A computer useable medium can include magnetic media, optical media, or other recordable media These computer program products are means for providing software to computer system 1400.

Computer programs (also called computer control logic) are stored in main memory 1408 and/or secondary memory 1410. Computer programs can also be received via communications interface 1424. Such computer programs, when executed, enable the computer system 1400 to perform the features of the present invention as discussed herein. In particular, the computer programs, when executed, enable the processor 1404 to perform the features of the present invention. Accordingly, such computer programs represent controllers of the computer system 1400.

In an embodiment where the invention is implemented using software, the software may be stored in a computer program product and loaded into computer system 1400 using removable storage drive 1414, hard drive 1412, or communications interface 1424. Alternatively, the computer program product may be downloaded to computer system 1400 over communications path 1426. The control logic (software), when executed by the one or more processors 1404, causes the processor(s) 1404 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

Conclusion

While specific embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A computer usable medium having control logic therein for causing a computer to manage jitter within packets exchanged between a packet switched network and the public switched telephone network, said control logic comprising:
   computer readable program code that causes the computer to handle the traffic from the packet-switched network to the public switched telephone network; and
   computer readable program code that causes the computer to manage the jitter of said traffic, wherein the computer adjusts an adaptive buffer to regulate the flow of data packets, wherein a size of the adaptive buffer is determined based on jitter measurement for a message currently being processed, an average jitter of a set of received data packets and the average jitter variation of the set of received data packets.

2. A computer usable medium having control logic therein for causing a computer to manage the flow of a data packet within a set of data packets, said control logic comprising:
   (a) computer readable program code that causes the computer to receive the data packet, wherein the received data packet is the most recent data packet received within the set of data packets;
   (b) computer readable program code that causes the computer to measure a jitter for the data packet received in step (a);
   (c) computer readable program code that causes the computer to compute a jitter variation for the data packet received in step (a);
   (d) computer readable program code that causes the computer to compute an average jitter measurement for the set of data packets;
   (e) computer readable program code that causes the computer to compute an average jitter variation for the set of data packets; and
   (f) computer readable program code that causes the computer to compute a target buffer size, wherein the target buffer size is a function of the average jitter measurement and the average jitter variation.

3. A computer usable medium having control logic therein for causing a computer to calculate the size of a buffer used to manage the flow of a set of received data packets, said control logic comprising:
   (a) computer readable program code that causes the computer to establish a minimum buffer size;
   (b) computer readable program code that causes the computer to compute an average jitter measurement based on at least two received data packets;
   (c) computer readable program code that causes the computer to compute an average jitter variation measurement based on at least two received data packets; and
   (d) computer readable program code that causes the computer to determine a target buffer size based on the values determined in (a), (b) and (c).

* * * * *